May 31, 1927.
R. A. WALKER
OIL FILTER
Filed April 3, 1926
1,630,504
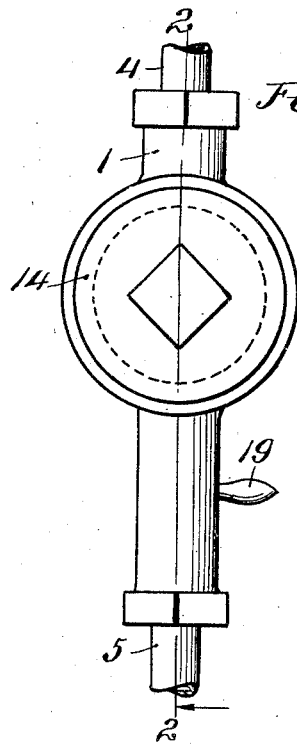
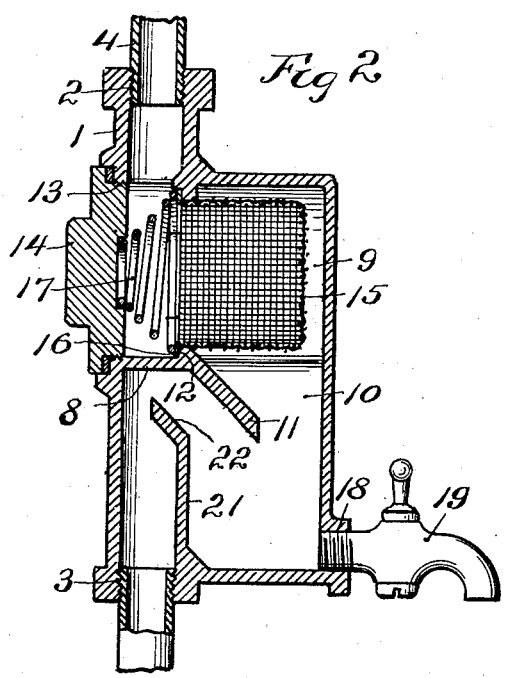
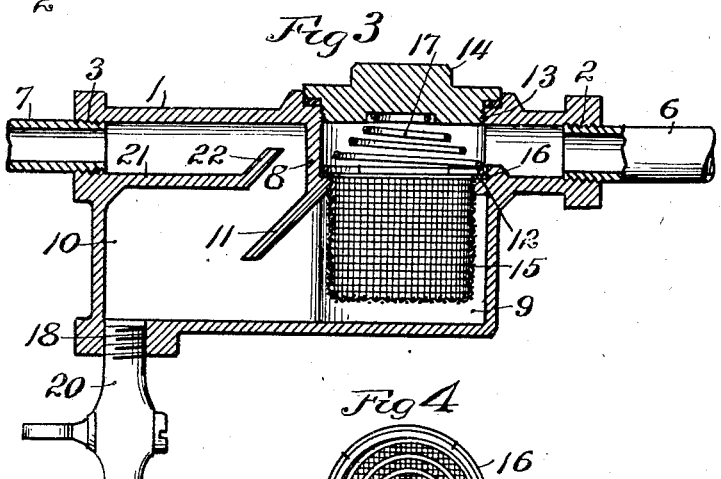
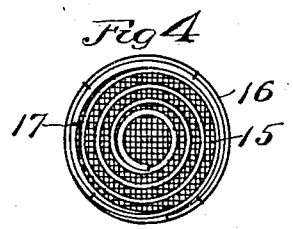
INVENTOR.
Richard A. Walker
BY Warren D. House
His ATTORNEY.
Witness:
R. E. Hamilton Patented May 31, 1927.

1,630,504

UNITED STATES PATENT OFFICE.

RICHARD A. WALKER, OF SKIDMORE, MISSOURI.

OIL FILTER.

Application filed April 3, 1926. Serial No. 99,598.

My invention relates to improvements in oil filters. One of the objects of my invention is to provide a novel oil filter adapted for use in separating water, sediment and other impurities from oil. It is particularly well adapted for use in an oil supply system connected with oil burners.

A further object of my invention is to provide a novel filter of the kind described, which is simple, cheap, easily installed, durable, not liable to get out of order, which is efficient and readily cleaned and which will operate efficiently in either a horizontal or vertical position.

My invention provides further novel means for separating water from the oil.

My invention provides also a novel means for filtering the oil.

The novel features of my invention are hereinafter fully described and claimed.

In the accompanying drawing, which illustrates the preferred form of my invention, Fig. 1 is a side elevation of my improved oil filter shown disposed in a vertical pipe line.

Fig. 2 is a section on the line 2—2 of Fig. 1.

Fig. 3 is a longitudinal sectional view of my improved filter shown disposed in a horizontal pipe line.

Fig. 4 is an end view of the strainer and spring attached thereto.

Similar reference characters designate similar parts in the different views.

1 designates the casing of the filter, having at one end an oil inlet 2 and at its other end an oil outlet 3. When the filter is used in a vertical pipe line, the pipes 4 and 5 are respectively fitted in the inlet 2 and outlet 3. When used in a horizontal pipe line, the pipes 6 and 7 are respectively fitted in the inlet 2 and the outlet 3. The pipes 4 and 6 connect with the oil supply, and the pipes 5 and 7 with the burners, not shown.

The casing 1 has in it a partition 8 which divides the casing into a filtering chamber 9 and a settling chamber 10, which communicate with each other at the end of an obliquely disposed end portion 11 of the partition.

The chamber 9 has an annular seat 12, and communicates with a clean out opening 13 in which is removably fitted a closure, which may be a screw plug 14 fitted in the opening 13. A strainer 15, which may be cup shaped and formed of wire gauze or other perforate material, has a peripheral flange 16 which rests on the seat 12 and to which may be fastened one end coil of a convolute spring 17, the other end of which bears against the inner side of the screw plug closure 14. When the latter is removed, the strainer 15 may be removed through the clean out opening 13, the spring 17 being grasped for this purpose, thus affording the functions of a handle for the strainer and as a yielding means for holding the strainer 15 seated, when in either of the two positions of the casing 1, shown in Figs. 2 and 3.

The settling chamber 10 communicates with a water outlet 18 provided in the wall of the casing 1 and having a closure, such as a faucet 19, when the casing is vertically disposed, or a drain cock 20, Fig. 3, when the casing is horizontally disposed.

The casing 1 has a partition 21 intermediate of the water outlet 18 and the oil outlet 3, in the chamber 10. The partition 21 has an oblique end portion 22 spaced from, parallel with and overlapping the end portion 11 of the partition 8.

The partitions 8 and 21 form in the chamber 10 a Z shaped passage one arm of which communicates with the outlet 3 and the other arm of which communicates with the water outlet 18 and the chamber 9. The outlet 18 is disposed lower than the end portions 11 and 21 when the casing is disposed in the two positions at right angles to each other, shown in Figs. 2 and 3. Thus, when disposed in either of these two positions, water carried with the oil entering at the inlet 2, and passing through the filter or strainer 15 and into the chamber 10, will be trapped in said chamber, from which the water may be drained through the water outlet 18, by opening the faucet 19 or drain cock 20, as the case may be. The oil will pass upwardly between the end portions 11 and 22 and out of the oil outlet 3. The coarser impurities in the oil will be caught by the strainer 15, and the finer particles or sediment will pass through the strainer and into the chamber 10, from which such impurities may be withdrawn with the water through the water outlet 18.

By removing the screw plug closure 14, the strainer 15 may be withdrawn through the clean out opening 13, by means of the spring 17, for cleansing. After replacement of the filter 15, the screw plug 14 is screwed into the opening 13, and by bearing against and compressing the spring 17, it will hold the flange 16 against the seat 12. The flange 16 may have its wires soldered to each other, when the filter is made of wire netting, to make the flange substantial.

In installing the filter, it is sometimes required that it be disposed in either the vertical or the horizontal position. By disposing the partitions 8 and 21 and the water outlet 18, as described, the water and sediment will be trapped and held in the chamber 10, when the casing is in either of these two positions.

I do not limit my invention to the structure shown and described, as many modifications, within the scope of the appended claims, may be made without departing from the spirit of my invention.

What I claim is:—

1. In an oil filter, a casing having an oil inlet, an oil outlet, a water outlet having a closure, and a clean out opening having a removable closure, the casing having a partition dividing it into a filtering chamber and a settling chamber, the filtering chamber communicating with said oil inlet and with said clean out opening and said settling chamber, the latter communicating with said oil outlet and said water outlet, the casing having a partition intermediate of said oil outlet and said water outlet and having an end portion overlapping and spaced from the end portion of the first named partition, said water outlet being lower than both of said end portions when the casing is in either of two positions at right angles to each other, and a strainer extending across said filtering chamber.

2. In an oil filter, a casing having an oil inlet, an oil outlet, and a water outlet having a closure, and provided with two partitions having end portions spaced from and overlapping each other, one of said partitions being disposed between said oil outlet and said water outlet, the latter being lower than both of said end portions when the casing is in either of two positions at right angles to each other.

3. In an oil filter, a casing having an oil inlet, an oil outlet, a water outlet having a closure, and a clean out opening having a removable closure, and having two partitions, one of which divides the casing into a settling chamber and a filtering chamber, the latter having an annular seat and communicating with said oil inlet and with said clean out opening and said settling chamber, the latter communicating with said oil outlet and with said water outlet, the other partition being disposed in said settling chamber between said oil outlet and said water outlet, and said partitions having end portions overlapping and spaced apart from each other, said water outlet being lower than said end portions in either of two positions at right angles to each other of said casing, a strainer resting on said seat, and a spring bearing on said strainer and on said removable closure.

In testimony whereof I have signed my name to this specification.

RICHARD A. WALKER.